United States Patent [19]

Mizuno

[11] 4,215,374
[45] Jul. 29, 1980

[54] ENCODING DEVICE COMPRISING PREDICTORS FOR THINNED AND UNTHINNED PATTERNS

[75] Inventor: Shoji Mizuno, Tokyo, Japan
[73] Assignee: Nippon Electric Company, Ltd., Tokyo, Japan
[21] Appl. No.: 16,635
[22] Filed: Mar. 1, 1979
[30] Foreign Application Priority Data Mar. 2, 1978 [JP] Japan .................................. 53-24095

[51] Int. Cl.² ............................................. H04N 7/12
[52] U.S. Cl. .................................... 358/260; 358/136
[58] Field of Search ............... 358/135, 136, 138, 260, 358/261

[56] References Cited

U.S. PATENT DOCUMENTS

| | | | |
|---|---|---|---|
| 2,905,756 | 9/1959 | Graham | 358/135 |
| 4,133,006 | 1/1979 | Iinuma | 358/136 |
| 4,144,547 | 3/1979 | Stoffel | 358/260 |

Primary Examiner—Robert L. Griffin
Assistant Examiner—Joseph A. Orsino, Jr.
Attorney, Agent, or Firm—Sughrue, Rothwell, Mion, Zinn and Macpeak

[57] ABSTRACT

For selectively carrying out predictive encoding of an original pattern of a first tone on a background of a second tone and a thinned pattern having, in effect, the first tone on its background corresponding to the second tone, a device comprises a predictor responsive to a set of sample pulses representative of a few picture elements selected from those sampled from the original pattern and its background for producing each of prediction error pulses of a sequence, another predictor responsive to a set of pre-processed pulses representative of several picture elements selected from those sampled, in effect, from the thinned pattern and its background for producing each of error pulses of another sequence, a selector for selecting one of the original and the thinned patterns and consequently one of the predictors to produce a selection code indicative of the selected predictor, and an encoder for encoding the error pulses produced by the selected predictor into an encoded signal including the selection code. Preferably, each predictor is operable to produce for each error pulse a mode code indicative of one of two or more groups into which all allowable permutations of at least one of the two tones of the selected picture elements are classified and, in comsideration of which, codes are predetermined for all possible durations of same error pulse. The encoder uses the mode code for the respective error pulses in selecting some or all of the predetermined codes and arranges the selected codes in a predetermined order.

4 Claims, 11 Drawing Figures

FIG 1
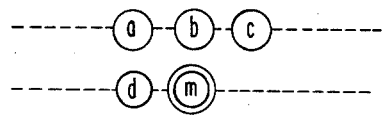
FIG 2
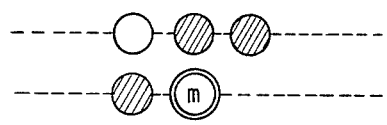
FIG 3
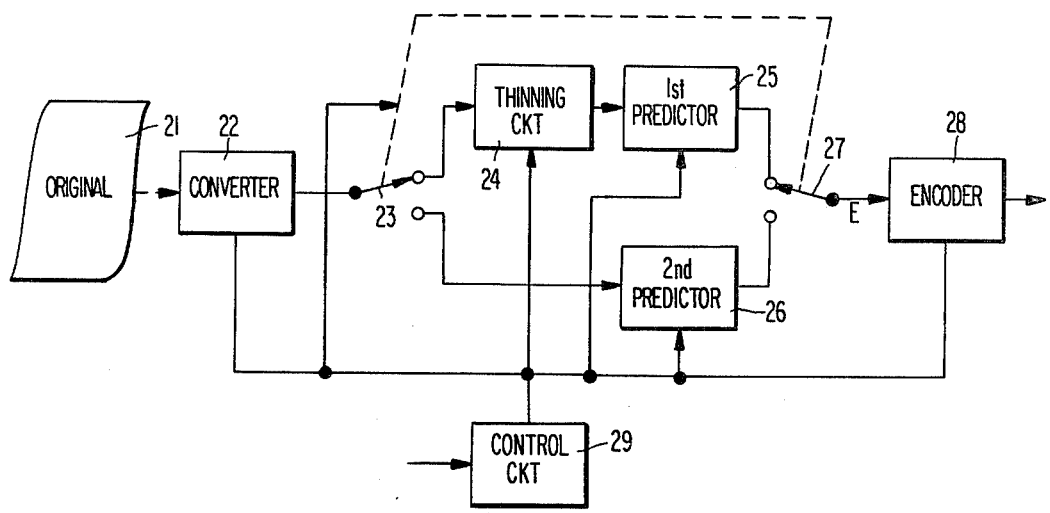
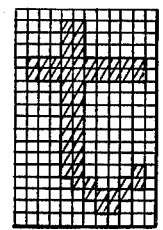 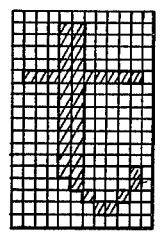 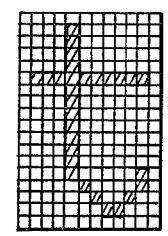
FIG 4 (a) (b) (c)

ENCODING DEVICE COMPRISING PREDICTORS FOR THINNED AND UNTHINNED PATTERNS

BACKGROUND OF THE INVENTION

This invention relates to a device for encoding a pattern or picture, such as at least one hand-printed letter or a drawing, by predictive encoding. A pattern encoding device according to this invention is well applicable to a transmitter of a facsimile transmission system.

It is general on encoding a pattern into an encoded signal together with a background of the picture to resort to predictive encoding wherein correlation between successive information pieces, such as picture elements sampled from the pattern and the background, is utilized in order to compress the bandwidth or the amount of the encoded signal to be transmitted from a transmitter to a receiver or receivers and thereby to make an effective use of a transmission channel as regards both frequency and time. On the other hand, it is already known to pre-process the pattern with a view to achieving a higher compression ratio and consequently a higher transmission speed.

Thinning is an advantageous pre-processing scheme when an original pattern consists of at least one original line having an original line width of from one to several picture elements. According to the thinning process, such an original pattern is thinned in the transmitter into a thinned pattern consisting of at least one thinned line, each having a thinned line width of substantially one picture element and being representative of a skelton or a medial line of each original line. The thinned pattern as called herein is not visible but is represented by a pre-processed signal, which is encoded into an encoded signal, such as a run-length code signal, for transmission to the receiver or receivers. In the receiver, a signal representative of the thinned pattern is recovered from the encoded signal. The thinned pattern thus recovered is thickened into a reproduced or reconstructed pattern that is similar to the original pattern to a certain extent of faithfulness.

Thinning, however, is not always advantageous. Not a few original or unthinned patterns have to be encoded directly without thinning when the patterns reproduced in at least one of the receivers should be as faithful to the original patterns as possible. It is therefore desirable that a pattern encoding device be capable of encoding a variety of patterns selectively with the thinning process utilized to attain a higher transmission speed and without using the thinning process to thereby insure reproduction with a best possible degree of faithfulness.

As will later be described in detail with reference to a few of several figures of the accompanying drawing, different prediction rules or algorithms are necessary in a device for carrying out predictive encoding selectively for a thinned and an unthinned pattern. A conventional device for encoding information by predictive encoding, however, is operable in accordance with only one prediction rule. It has therefore been impossible to achieve predictive encoding selectively for the thinned and the unthinned patterns.

SUMMARY OF THE INVENTION

It is therefore an object of the present invention to provide a pattern encoding device that is operable to encode a variety of patterns by predicting encoding.

It is another object of this invention to provide a pattern encoding device of the type described, which is capable of carrying out predictive encoding of various patterns selectively for a higher transmission speed and for reproduction with a best attainable degree of faithfulness.

It is still another object of this invention to provide a pattern encoding device of the type described, which is capable of selectively subjecting a thinned and an unthinned pattern to predictive encoding.

According to this invention, there is provided a device for encoding an original pattern and a first area into an encoded signal. The pattern is printed on a surface of a pattern carrying medium with the area left on the surface as a background of the pattern. The pattern and the area are substantially of a first and a second tone, respectively. The device comprises sampling means, thinning means, first and second predicting means, selecting means, and encoding means, which are specified hereunder.

The sampling means is for scanning the surface substantially along rectilinear and parallel scanning lines in succession and for sampling, at predetermined sampling instants, sequential picture elements along the respective scanning lines from the pattern and the area to produce, substantially at the respective sampling instants, successive sample pulses representative of the picture elements of the pattern and the area with a first and a second level, respectively.

The thinning means is responsive to the sample pulses for carrying out, in effect, thinning of the original pattern into a thinned pattern having less picture elements than the original pattern and thereby widening of the first area into a second area having accordingly increased picture elements as compared with the first area to produce, substantially at the respective sampling instants, successive pre-processed pulses representative of the picture elements of the thinned pattern and the second area with a third and a fourth level, respectively.

The first predicting means is responsive to a first reference set of picture elements for predicting, in effect, a first predicted picture element for a first actual picture element in accordance with a first prediction rule to produce a first prediction error pulse representative of an error between the predicted and the actual picture elements. The actual picture element is represented by the pre-processed pulse produced by the thinning means at each of the sampling instants. The picture elements of the reference set are represented by the pre-processed pulses produced by the thinning means at those of the sampling instants which are selected therefrom according to a first predetermined rule and include the sampling instant next previous to the above-mentioned each sampling instant. The first predicting means thereby produces a sequence of first prediction error pulses as at least a portion of an output signal thereof.

The second predicting means is responsive to a second reference set of picture elements for predicting, in effect, a second predicted picture element for a second actual picture element in compliance with a second prediction rule, different from the first prediction rule, to produce a second prediction error pulse representative of an error between the second predicted and actual picture elements. The second actual picture element is represented by the sample pulse produced by the sampling means at each of the sampling instants. The picture elements of the second reference set are represented by the sample pulses produced by the sampling means at those of the sampling instants which are selected therefrom complying with a second predetermined rule and include the sampling instant next previous to the sampling instant at which the sample pulse representative of the second actual picture element is produced. The second predicting means thereby produces a sequence of second prediction error pulses as at least a portion of an output signal thereof.

The selecting means is for selecting one of the first and the second predicting means to produce a selection code indicative of the selected predicting means.

The encoding means is for encoding the output signal of the selected predicting means into the encoded signal with the selection code placed therein.

Alternatively, it is possible to substitute, for the above-defined encoding means, first and second encoding means and multiplexing means with the above-specified selecting means substituted for by different selecting means. The first and the second encoding means are for encoding the respective output signals of the first and the second predicting means to produce sequences of first and second codes, respectively. The different selecting means is for selecting one of the first and the second encoding means to produce a selection code indicative of the selected encoding means. The multiplexing means is for multiplexing the selection code and one of the sequences of first and second codes that is produced by the selected encoding means. The multiplexing means thus produces the encoded signal.

BRIEF DESCRIPTION OF THE DRAWING

FIG. 1 shows a set of picture elements of a pattern to be dealt with by a pattern encoding device according to the instant invention;

FIG. 2 illustrates an actual example of the picture element set depicted in FIG. 1;

FIG. 3 shows a block diagram of a pattern encoding device according to a first embodiment of this invention, together with a document supplied thereto;

FIGS. 4a–4c show a few patterns for a letter "t" in order to describe a thinning process carried out in the encoding device illustrated in FIG. 3;

DESCRIPTION OF THE PREFERRED EMBODIMENTS

Figure 5:
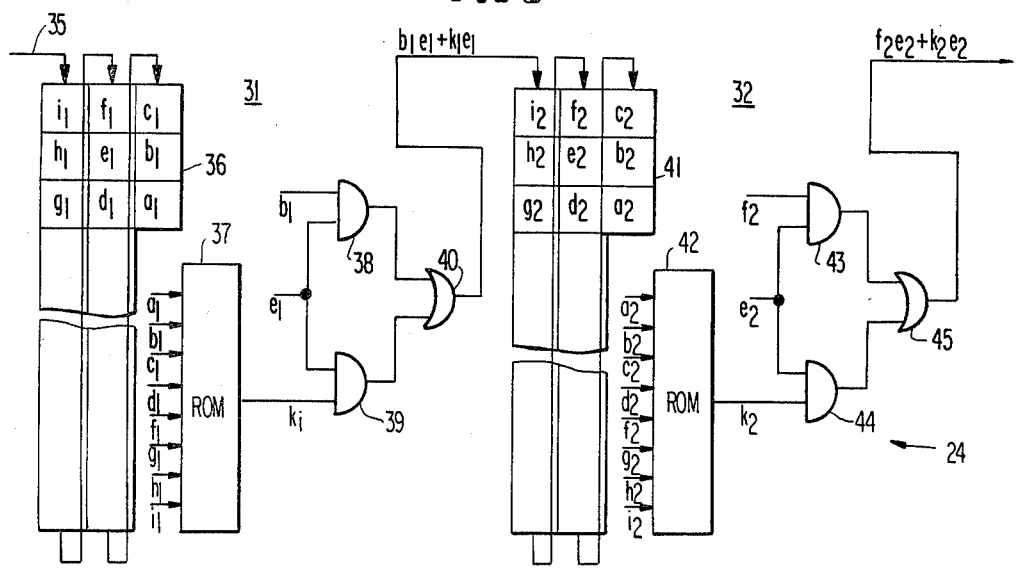
FIG. 5 is a block diagram of a thinning circuit for carrying out the thinning process illustrated in FIG. 4.

Referring to FIG. 1, predictive encoding of a pattern will be described at first in order to facilitate an understanding of the present invention. For transmission in general, a pattern and a background thereof are scanned substantially along rectilinear and parallel scanning lines from left to right in the drawing (main or principal scan) in succession from top to bottom (auxiliary scan). A number of picture elements are sampled from the pattern and the background, at predetermined sampling instants, along the respective sampling lines. It is usual that the instants are predetermined at prescribed sampling intervals. It is to be noted here that the expression "to encode a picture element" or similar expressions are used herein merely for brevity, where exact expressions should be "to encode a signal or pulse representative of a picture element" or the like. In the illustrated example, a reference set of first through fourth picture elements a, b, c, and d is used as a set of four reference picture elements in carrying out predictive encoding on an actual or "present" picture element m. The fourth element d is next previous to the present element m in a "present" scanning line. The second element b is most adjacent to the present element m in a next preceding scanning line. The first and the third elements a and c are next preceding and succeeding, respectively, the second element b in the next previous scanning line. The present element m is predicted as a predicted picture element $\hat{m}$ by:

$$\hat{m} = F(a, b, c, d),$$

where F represents a prediction function or rule selected to give a greatest possible probability to the event that the predicted element m agrees with the actual element m. A prediction error E, which is zero and equal to a finite value when the prediction is correct and wrong, respectively, between the predicted and the actual elements $\hat{m}$ and m is encoded into an encoded signal for successive picture elements, such as m. It is possible thereby to achieve a higher compression ratio when the prediction function F is selected to give a greater probability on the average to render a greater number of the successive prediction errors E zero. When each picture element, such as a, b, c, d, m, or $\hat{m}$, is either substantially white or black and represented by either of logic "0" and "1" pulses, the error E is given by:

$$E = \hat{m} \oplus m,$$

where $\oplus$ represents Exclusive OR.

Referring to FIG. 2, it will become clearer that the prediction function F should be different for a thinned and an original or unthinned pattern. Let the picture elements hatched an unhatched represent the black and the white elements, respectively. When the pattern is a thinned one, the predicted element $\hat{m}$ should be white. When the pattern is unthinned, the predicted element $\hat{m}$ is most likely black. It is now evident that a thinned and an unthinned pattern has to be subjected to predictive encoding with the prediction function F selected accordingly.

Referring now to FIG. 3, a pattern encoding device according to a first embodiment of this invention will be described as applied to a facsimile transmitter for an original copy or document 21 that has an original pattern, such as black letters, printed or recorded on a surface of a pattern carrying medium which may be a sheet of paper. It is assumed here that the original pattern comprises an original line having an original line width that may vary from a portion of the pattern to another portion. A first area of the pattern carrying medium surface is left as a background of the original pattern. The document 21 is scanned by a known photoelectric converter 22 of the encoding device. It is possible to presume without loss of generality that the converter 22 is repeatedly moved relative to the document 21 from left to right in the drawing (principal scan) while either continuously or intermittently fed from top to bottom (auxiliary scan). The document 21 has a document width in the direction of the principal scan and is covered by a raster of successive scanning lines. While scanned, the original pattern and the first area are sampled into a number of picture elements, such as black and white picture elements, represented by binary pulses. The pulses may be, for example, logic "0" and "1" pulses for the white and the black elements, respectively. When the original pattern is of more than one tone, the converter 22 should be accompanied by a color filter (not shown). It is thus generally possible to deem the original pattern and the first area to be of a first and a second tone, respectively. The picture elements are of a size such that the original line width is represented generally by a few picture elements. The converter 22 thus produces a sequence of sample pulses of the logic "1" and "0" levels representative of the respective picture elements.

Further referring to FIG. 3, the encoding device comprises a first switch 23 having a first and a second fixed contact. The switch 23 supplies the sample pulse sequence to a thinning circuit 24 through the first contact. Responsive to the sample pulse sequence, the thinning circuit 24 produces a sequence of pre-processed pulses representative of the respective picture elements of an eventually thinned pattern and of a second area that serves as a background of the thinned pattern. The thinned pattern has a thinned line width of a substantially single picture element and therefore less picture elements than the original pattern. The second area has an accordingly increased number of picture elements as compared with the first area. A first prediction circuit or predictor 25 is for predicting, in effect, successive picture elements from the respective sets of reference picture elements to produce a sequence of first prediction error pulses, each representative of an error between a first actual picture element represented by each pre-processed pulse and the picture element predicted as a first predicted picture element for the actual element under consideration from a pertinent set of pre-processed pulses representative of the reference elements therefor. The sample pulse sequence is supplied directly to a second prediction circuit or predictor 26 through the second fixed contact of the switch 23 and is converted to a sequence of second prediction error pulses representative of second prediction errors between second actual picture elements represented by the successive sample pulses and the elements predicted as second predicted elements therefor from the relevant sets of sample pulses representative of the reference elements. A second switch 27 is ganged with the first switch 23 and has two fixed contacts corresponding to the first and the second fixed contacts, respectively. An encoding circuit 28 is supplied selectively with the first and the second prediction error pulse sequences through the second switch 27 to encode the supplied sequence of prediction error pulses to an encoded or band-compressed signal representative of either the thinned or the unthinned pattern and the background and consequently, in effect, the original pattern and the first area. The thinning process and the thinning circuit 24 are described in a copending patent application Ser. No. 922,701 filed July 7, 1978, by Shoji Mizuno, the present applicant. Examples thereof will nevertheless be described later for completeness of the disclosure together with examples of the prediction circuits 25 and 26 and the encoding circuit 28.

Although not depicted in FIG. 3, a detector is comprised by the encoding device in order to detect the document 21 and produce a detection signal during presence thereof in the encoding device. Responsive to the detection signal, a control circuit 29 produces verious control signals for putting the photoelectric converter 22, the thinning circuit 24, the prediction circuits 25 and 26, and the encoding circuit 28 into proper operation and keeping them therein. For example, the control circuit 29 supplies the converter 22 with a sequence of clock pulses so as to enable the latter produce the sample pulses in synchronism therewith. The thinning circuit 24 and the prediction circuits 25 and 26 thus produce their respective output pulses substantially at the respective sampling instants. One of the control signals is for the switches 23 and 27 and is produced, rather than in response to the detection signal, as a result of selection as to whether the thinning process should be resorted to or not for a pattern to be encoded by the encoding device. Other examples of the control signals will be described later. The encoded signal is transmitted to a decoder or decoders coupled to the encoding device being illustrated.

Referring to FIG. 4, the thinning circuit 24 (FIG. 3) iteratively carries out a certain number of thinning steps on the original pattern. An original pattern for a single letter "t" is exemplified in FIG. 4 (a) with twelve picture elements along each scanning line and eighteen in the direction of the auxiliary scan. The original pattern in question consists only of two strokes, which may be deemed to be two original lines, each having an original line width of two picture elements. It is possible to assume that each picture element, either white or black, has four vertices and those four sides which are contiguous to the similar sides of eight neighboring or next adjacent picture elements even if the picture elements may be of a rectangle or a parallelogram in outline. According to one aspect of the thinning process, a plurality of black picture elements are said to have a linkage when either a side or even a vertex is had in common by any two of the black elements under consideration. With an example of the thinning circuit 24, each black element having a white element in its upper (top) neighborhood is transformed during a first step of the iterative thinning steps into a white element with a proviso such that the linkage present in the original pattern is not lost between the black elements remaining after such transformation. The original pattern shown in FIG. 4 (a) is thus thinned into a first thinned pattern depicted in FIG. 4 (b). In a second step, each black element having a white element in its right neighborhood is transformed with the same proviso into a white element. The first thinned pattern is thereby further thinned into a second thinned pattern shown in FIG. 4 (c). In the illustrated example, the second thinned pattern has a thinned line width of a single picture element and is an eventually thinned pattern that can not more be thinned even if the thinning step or steps may further be iterated.

Figure 6:
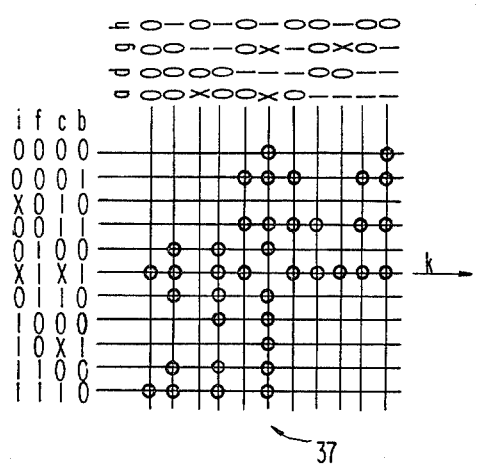
FIG. 6 shows a read-only memory used in the thinning circuit depicted in FIG. 5.

Turning to FIG. 5, which is a substantial reproduction of FIG. 6 of the above-referenced copending patent application, the above-mentioned example of the thinning circuit 24 comprises a series connection of a preselected number of similar thinning units, such as a first thinning unit 31 for the first step and a second thinning unit 32 for the second step. A boundary black picture element having a white element in its neighborhood is now called an end or eventual picture element when the linkage present in the original pattern would be lost if the boundary element under consideration be transformed into a white element. The preselected number may be equal to the greatest number of picture elements in the original line width. The first thinning unit 31 is supplied with the sample pulses from the photoelectric converter 22 (FIG. 3) through a connection 35 and comprises a shift register 36 having $(2n+3)$ stages for the successive logic "0" and "1" pulses, where n represents the number of picture elements in each scanning line that is at least as long as the document width. A sequence of shift pulses for the shift register 36 is supplied from the control circuit 29 in synchronism with the clock pulses delivered to the converter 22.

In FIG. 5, nine stages of the shift register 36 are depicted in a two-dimensional array merely for the convenience of understanding. The nine stages are for the sample pulses representative of a square matrix of (3×3) picture elements, namely, three elements a, b, and c in a first scanning line, those d, e, and f contiguous to the elements a, b, and c, respectively, in a second scanning line immediately following the first line, and those g, h, and i contiguous to the elements d, e, and f, respectively, in a third scanning line next succeeding the second line. The element e is at the center of the matrix and will therefore be referred to as a center element. The pulses stored in the nine stages are denoted by the picture element symbols with a suffix "1" added thereto, thus, $a_1$, $b_1$, and so forth. The shift register 36 is for deciding whether or not a center element e is an end element. For this purpose, the first thinning unit 31 comprises a skelton read-only memory 37 responsive to the sample pulses $a_1$ through $d_1$ and $f_1$ through $i_1$ for eight picture elements a through d and f through i neighboring the center element e a first skelton pulse $k_1$ that is given the logic "1" and "0" levels as will shortly be described when the center element e is and is not an end element, respectively.

Referring temporarily to FIG. 6, which is a reproduction of FIG. 17 of the above-cited copending patent application, the skelton read-only memory 37 may comprise eleven row conductors and eleven column conductors. The sample pulses for the picture elements a, d, g, and h specify one of the column conductors at a time according to the illustrated combinations of the logic levels where the level designated by a cross (X) may be whichever of the logic "0" and "1" levels. Similarly, the sample pulses for the elements b, c, f, and i energize one of the row conductors. According as the cross-point of the selected one each of the row and the column conductors is marked with a circle (representative of "0") and not, the read-only memory 37 produces the skelton pulse k (suffix omitted) with the logic "0" and "1" levels, respectively. It will readily be understood that various combinations of the sample pulses for the respective picture elements a through i are capable of addressing one of the cross-points.

Turning back to FIG. 5, the first thinning unit 31 further comprises a first AND gate 38 responsive to the sample pulses $e_1$ and $b_1$ for giving an output pulse $b_1e_1$ thereof the logic "1" and "0" levels when the center element e and the element b in its upper neighborhood are both black and otherwise, respectively. The sample pulse $e_1$ and the skelton pulse $k_1$ are supplied to a second AND gate 39, whose output pulse $k_1e_1$ is given the logic "1" and "0" levels when the center element e is an end element and is not, respectively. Therefore, an OR gate 40 responsive to the pulses $b_1e_1$ and $k_1e_1$ produced by the AND gates 38 and 39 successively produces output pulses $b_1e_1+k_1e_1$ representative of a first thinned pattern.

As shown in FIG. 5, the second thinning unit 32 comprises another $(2n+3)$-bit shift register 41 supplied with the successive output pulses $b_1e_1+k_1e_1$ of the OR gate 40 of the first thinning unit 31. According as the center element e that moves relative to the document 21 is in the positions corresponding to the elements a through i of the (3×3)-element matrix, the output pulses of the OR gate 40 are designated by $a_2$ through $i_2$. As is the case with the first thinning unit 31, the second thinning unit 32 further comprises a skeleton read-only memory 42, AND gates 43 and 44, and an OR gate 45. The read-only memory 42 is similar in structure and operation to that illustrated with reference to FIG. 6 and produces a second skelton pulse $k_2$. The AND gate 43 corresponding to the first AND gate 38 is supplied with the output pulses $e_2$ and $f_2$ for the center element e for the first thinned pattern and the element f in its right neighborhood. The OR gate 45 successively produces output pulses $f_2e_2+k_2e_2$ representative of a second thinned pattern.

Although not depicted in FIG. 5, a third thinning unit and others should be used if necessary. In the third thinning unit, an OR gate corresponding to the OR gate 40 or 45 may successively derive output pulses $h_3e_3+k_3e_3$ representative of a third thinned pattern in which each black picture element having a white one in its lower neighborhood is transformed into a white element unless the black element in question is an end element. The thinning circuit 24 thus successively produces the pre-processed pulses representative of an eventually thinned pattern and the second area with the logic "1" and "0" levels, respectively.

Figure 7:
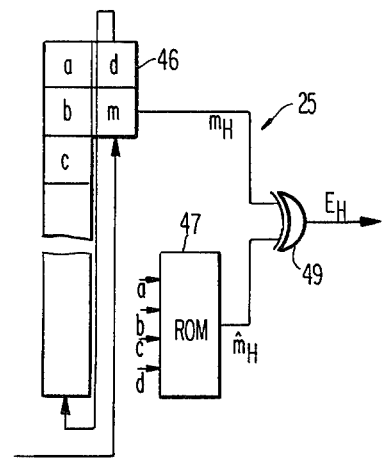
FIG. 7 is a block diagram of a prediction circuit used in the encoding device shown in FIG. 5.

Turning to FIG. 7, an example of the first prediction circuit 25 is responsive to the pre-processed pulse sequence for producing a sequence of first prediction error pulses $E_H$. The suffix "H" represents the fact that each symbol with such a suffix is applicable to an eventually thinned pattern and the second area. The pre-processed pulse sequence is supplied to an $(n+2)$-bit shift register 46, from which the pre-processed pulses a, b, c, and d (the alphabets representative of the picture elements being used) representative of four reference picture elements a, b, c, and d (FIG. 1) of the thinned pattern and/or the second area are delivered to a first prediction read-only memory 47 for predicting, in effect, a first predicted picture element $\hat{m}_H$ for a first actual picture element $m_H$ according to a first prediction function $F_H$ defined as:

$$\hat{m}_H = F_H(a, b, c, d),$$

which function $F_H$ is given in Table 1 below together with another predicted element $\hat{m}_O$ that will be described later. The read-only memory 47 is much simpler than the skeleton read-only memory, such as 37, and therefore will not be described in detail.

Table 1

| a | b | c | d | $\hat{m}_H$ | $\hat{m}_O$ |
|---|---|---|---|---|---|
| 0 | 0 | 0 | 0 | 0 | 0 |
| 0 | 0 | 0 | 1 | 0 | 0 |
| 0 | 0 | 1 | 0 | 1 | 0 |

Table 1-continued

| a | b | c | d | $\hat{m}_H$ | $\hat{m}_O$ |
|---|---|---|---|---|---|
| 0 | 0 | 1 | 1 | 0 | 0 |
| 0 | 1 | 0 | 0 | 0 | 0 |
| 0 | 1 | 0 | 1 | 1 | 0 |
| 0 | 1 | 1 | 0 | 0 | 1 |
| 0 | 1 | 1 | 1 | 0 | 1 |
| 1 | 0 | 0 | 0 | 1 | 1 |
| 1 | 0 | 0 | 1 | 0 | 0 |
| 1 | 0 | 1 | 0 | 0 | 1 |
| 1 | 0 | 1 | 1 | 1 | 1 |
| 1 | 1 | 0 | 0 | 1 | 1 |
| 1 | 1 | 0 | 1 | 0 | 1 |
| 1 | 1 | 1 | 0 | 0 | 1 |
| 1 | 1 | 1 | 1 | 1 | 1 |

Further referring to FIG. 7, the prediction read-only memory 47 produces a first predicted pulse $\hat{m}_H$ (the same symbol being used as the element) of, for example, the logic "0" level according to Table 1, supra, when the reference elements are:

$(a, b, c, d) = (0\ 1\ 1\ 1)$ as exemplified in FIG. 2. The predicted pulse $\hat{m}_H$ and the pre-processed pulse $m_H$ representative of the actual element $m_H$ are supplied to an Exclusive OR gate 49, which produces a sequence of the first prediction error pulses $E_H$.

The second prediction circuit 26 is similar in structure and operation to the first one 25 illustrated with reference to FIG. 7 except that a second prediction read-only memory is comprised instead of the first prediction read-only memory 47. The second read-only memory is for producing a second predicted pulse $\hat{m}_O$ representative of a second predicted element $\hat{m}_O$ (the same symbol being used) predicted for a second actual element $m_O$ of the original or unthinned pattern or of the first area according to a second prediction function $F_O$ given by:

$\hat{m}_O = F_O(a, b, c, d),$ where the suffix "O" represents that the so-suffixed symbols are related to the unthinned pattern and the first area. The second prediction circuit 26 produces a second prediction error pulse $E_O$ of, for example, the logic "1" level when the reference elements are:

$(a, b, c, d) = (0\ 1\ 1\ 1)$ again as shown in FIG. 2.

Figure 8:
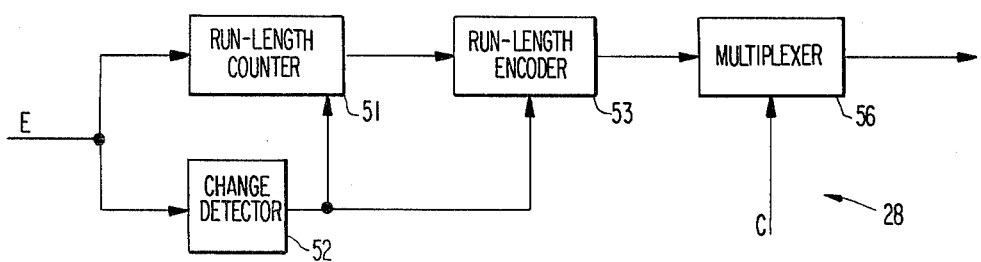
FIG. 8 is a block diagram of an encoding circuit used in the illustrated encoding device.

Referring to FIG. 8, an example of the encoding circuit 28 comprises a run-length counter 51 and a change detector 52 supplied with a selected sequence of prediction error pulses E ($E_H$ or $E_O$) through the second switch 27 (FIG. 3). The change detector 52 detects a change in the successive prediction error pulses E either from the logic "0" level (correct prediction) to the logic "1" level (wrong prediction) or vice versa to produce a timing pulse. The run-length counter 51 is counted up by the prediction error pulses E until a timing pulse is supplied from the change detector 52. When the count-up thereby comes to an end, the run-length counter 51 is cleared after having sent its content (run length) to a run-length encoder 53. Responsive to the supplied content of the run-length counter 51, the encoder 53 delivers a run-length code to a multiplexer 56. The timing pulses serve to control production of the respective run-length codes. The control circuit 29 supplies the multiplexer 56 with a selection code C that indicates whether the original pattern is thinned or not. The multiplexer 56 produces a sequence of run-length codes preceded by the selection code C.

Figure 9:
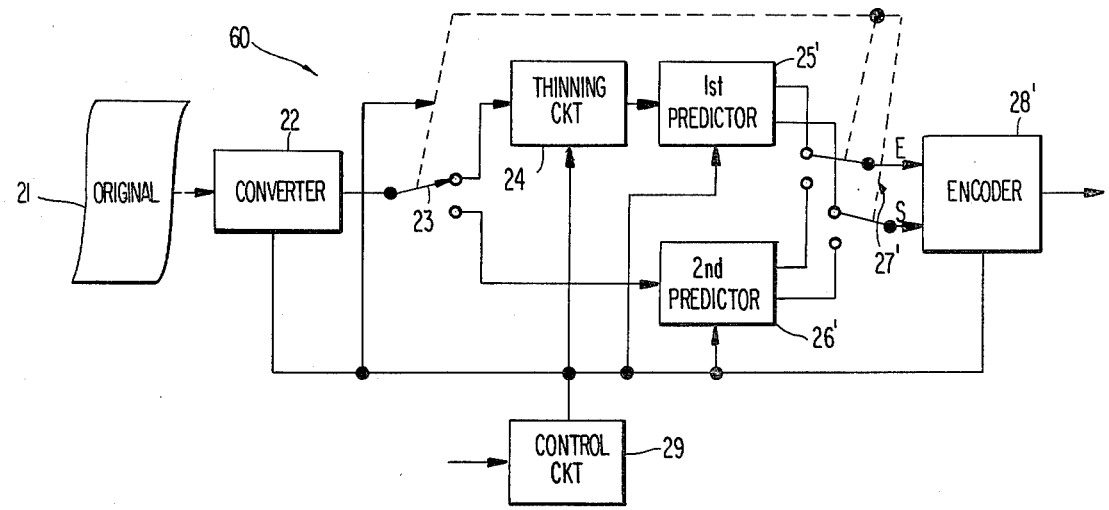
FIG. 9 shows a block diagram of a pattern encoding device according to a second embodiment of this invention, together with a document supplied thereto.

Turning now to FIG. 9, an encoding device 60 according to a second embodiment of this invention comprises similar parts designated by like reference numerals as in FIG. 3. In addition to the first prediction error pulse sequence $E_H$, the first prediction circuit 25' used in this encoding device 60 produces a sequence of first mode codes $S_H$ indicative of one, at a time, of a prescribed number of groups corresponding to degrees or ranks of the probability of the event that each of the first predicted picture elements $\hat{m}_H$ correctly agrees with the concerned one of the first actual elements $m_H$ of the thinned pattern and the second area, namely, that the first prediction error $E_H$ for the concerned actual element $m_H$ is equal to zero. Likewise, the second prediction circuit 26' produces a sequence of second mode codes $S_O$, each indicative of one of the above-mentioned prescribed number of degrees of the probability of the event that the second prediction error $E_O$ is rendered zero. The word "mode" is used for the codes $S_H$ and $S_O$ for the reason that will become clear as the description proceeds. The second switch 27' has two fixed contact pairs for selecting one of the first and the second prediction error pulse sequences E and the corresponding one of the first and the second mode code sequences S ($S_H$ or $S_O$) in compliance with the selection between the original and the thinned patterns. The encoding circuit 28' encodes the selected prediction error pulse sequence E into output codes predetermined in consideration of the degrees of probability indicated by the respective mode codes S of the selected mode code sequence and produces an encoded signal by arranging the selection code C and the output codes in a predetermined order. The output codes are predetermined so as to raise the compression ratio even when the original pattern is encoded without thinning.

It should be understood in connection with the encoding device 60 illustrated with reference to FIG. 9 that the above-mentioned degrees are dependent on various permutations of the black and the white picture elements, such as exemplified in FIG. 2, in the reference picture elements, such as a, b, c, and d depicted in FIG. 1, although the actual probabilities vary more or less with the overall permutation of the black and the white elements in the whole pattern. It is to be noted here that the probability is different for the thinned and the unthinned patterns even when the reference elements have one and the same permutation. For example, typical probabilities $P_H$ and $P_O$ for the thinned and the unthinned patterns are shown below in Tables 2 and 3 in the decreasing order, respectively, together with the predicted elements $\hat{m}_H$ and $\hat{m}_O$ given already in Table 1. In Tables 2 and 3, the mode codes $S_H$ and $S_O$ are also shown for a case in which the prescribed number is set at two. In this case, it is possible to classify the degrees by a probability of, for example, 0.90 and to name the two groups a higher and a lower probability group or mode. It is also possible to use the mode codes S of a single bit to which the logic "1" and "0" levels are assigned to indicate the higher and the lower probability modes, respectively.

Table 2

| a | b | c | d | $\hat{m}_H$ | $P_H$ | $S_H$ |
|---|---|---|---|---|---|---|
| 0 | 0 | 0 | 0 | 0 | 0.99 | 1 |
| 0 | 1 | 1 | 1 | 0 | 0.98 | 1 |
| 1 | 0 | 0 | 1 | 0 | 0.97 | 1 |
| 1 | 1 | 1 | 0 | 0 | 0.97 | 1 |
| 0 | 0 | 1 | 1 | 0 | 0.96 | 1 |
| 1 | 1 | 0 | 0 | 1 | 0.94 | 1 |
| 1 | 0 | 1 | 0 | 0 | 0.92 | 1 |
| 1 | 0 | 1 | 1 | 1 | 0.89 | 0 |
| 1 | 1 | 1 | 1 | 1 | 0.84 | 0 |
| 0 | 1 | 0 | 0 | 0 | 0.83 | 0 |
| 0 | 0 | 1 | 0 | 1 | 0.77 | 0 |
| 1 | 0 | 0 | 0 | 1 | 0.73 | 0 |
| 0 | 1 | 1 | 0 | 0 | 0.66 | 0 |
| 1 | 1 | 0 | 1 | 0 | 0.61 | 0 |
| 0 | 1 | 0 | 1 | 1 | 0.58 | 0 |
| 0 | 0 | 0 | 1 | 0 | 0.57 | 0 |

Table 3

| a | b | c | d | $\hat{m}_O$ | $P_O$ | $S_O$ |
|---|---|---|---|---|---|---|
| 0 | 0 | 0 | 0 | 0 | 0.99 | 1 |
| 0 | 0 | 0 | 1 | 0 | 0.99 | 1 |
| 0 | 0 | 1 | 0 | 0 | 0.97 | 1 |
| 1 | 1 | 0 | 0 | 1 | 0.97 | 1 |
| 1 | 1 | 0 | 1 | 1 | 0.97 | 1 |
| 1 | 1 | 1 | 0 | 1 | 0.97 | 1 |
| 1 | 1 | 1 | 1 | 1 | 0.94 | 1 |
| 0 | 1 | 0 | 1 | 0 | 0.92 | 1 |
| 0 | 0 | 1 | 1 | 0 | 0.85 | 0 |
| 1 | 0 | 1 | 0 | 1 | 0.84 | 0 |
| 1 | 0 | 0 | 1 | 0 | 0.83 | 0 |
| 0 | 1 | 1 | 0 | 1 | 0.82 | 0 |
| 0 | 1 | 0 | 0 | 0 | 0.80 | 0 |
| 1 | 0 | 1 | 1 | 1 | 0.76 | 0 |
| 0 | 1 | 1 | 1 | 1 | 0.64 | 0 |
| 1 | 0 | 0 | 0 | 1 | 0.57 | 0 |

Figure 10:
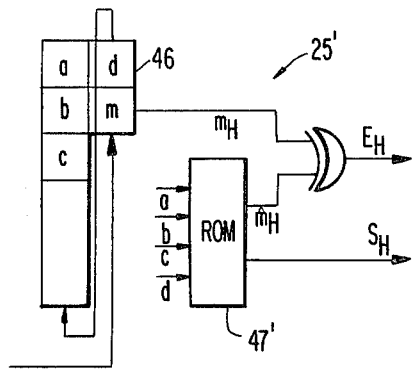
FIG. 10 is a block diagram of a prediction circuit used in the encoding device depicted in FIG. 9.

Referring to FIG. 10, an example of the first prediction circuit 25' comprises similar parts designated by like reference numerals as in FIG. 7. In addition to the first predicted pulses $\hat{m}_H$, a first prediction read-only memory 47' produces the first mode code $S_H$ exemplified in Table 2. The second prediction circuit 26' is different from the second prediction circuit 26 described with reference to FIG. 7 in respect of the second prediction read-only memory that produces, besides the second predicted pulses $\hat{m}_O$, the second mode codes $S_O$ exemplified in Table 3.

Figure 11:
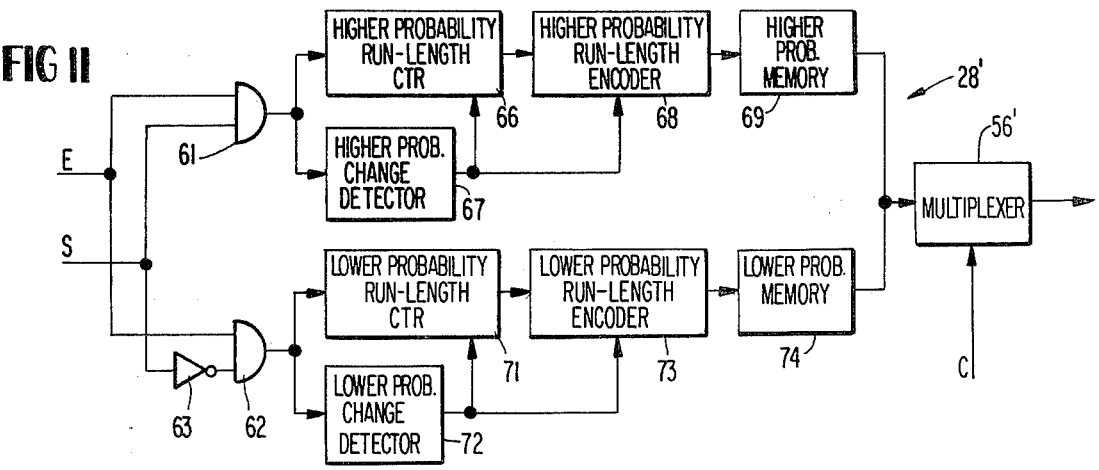
FIG. 11 is a block diagram of an ecoding circuit used in the encoding device illustrated in FIG. 9.

Referring finally to FIG. 11, an example of the encoding circuit 28' comprises higher and lower probability AND gates 61 and 62 supplied with the selected sequence of prediction error pulses E through the second switch 27'. The selected one of the first and the second mode codes S is supplied from the second switch 27' to the higher and the lower probability AND gates 61 and 62 directly and through an inverter 63, respectively. When the selected mode code S is indicative of the higher probability mode (logic "1"), the selected prediction error pulse or pulses E are supplied to a higher probability run-length counter 66 and a higher probability change detector 67, both operable like the corresponding parts 51 and 52 described in conjunction with FIG. 8 to supply the content (run length) of the former to a higher probability run-length encoder 68. The prediction error pulses E, whether selected by the second switch 27' or not, are very likely indicative of correct prediction under the circumstances. In other words, the run length is longer and shorter when the prediction is correct (logic "1") and wrong (logic "0"), respectively. The encoder 68 therefore produces shorter output codes (representative of smaller numbers) for longer successions of the logic "0" (correct prediction) error pulses E and longer ouput codes for longer successions of the logic "1" (wrong prediction) error pulses E. The output codes are stored in a higher probability memory 69. When the selected mode code S is indicative of the lower probability mode (logic "0"), the selected prediction error pulses E are delivered to a lower probability run-length counter 71 and a lower probability change detector 72. A lower probability run-length encoder 73 produces longer output codes for longer successions of the logic "0" (correct prediction) error pulses E and shorter output codes for longer successions of the logic "0" (wrong prediction) error pulses E. The output codes are stored in a lower probability memory 74. A multiplexer 56' arranges the selection code C sent from the control circuit 29 and the output codes stored in the higher and the lower probability memories 69 and 74 in a predetermined order and thereby produces an encoded signal. For this purpose, the control circuit 29 may supply the multiplexer 56' with synchronizing pulses indicative of the end of scan along each scanning line. As soon as each principal scan comes to an end, the output codes stored in the higher probability memory 69 are read out to make the memory 69 ready for the output codes to be delivered thereto during the next subsequent principal scan. The output codes stored in the other memory 74 are read out every time when the higher probability memory 69 is rendered vacant. The selection code C is placed next preceding the alternatingly continuously arranged output codes. It is now understood that the mode codes S are for controlling the modes of encoding.

While this invention has so far been described in specific conjunction with the preferred embodiments thereof, it is now obvious to those skilled in the art that various modifications are possible. For example, two encoding circuits may be used for the thinned and the unthinned patterns, respectively, with the first and the second predicting circuits 25 and 26 or 25' and 26' directly connected to the respective encoding circuits. The two encoding circuits may be combined together by a single multiplexer as is the case with the higher and the lower probability encoders 68 and 73 and the multiplexer 56' described in connection with FIG. 11. The pre-processed pulses may have a third and a fourth level for the thinned pattern and the second area, respectively. The first and the second prediction error pulses E may similarly have different levels according as the prediction is correct and wrong, respectively. The output codes may have a fifth and a sixth level for the correct and the wrong prediction, respectively. Each reference set of the picture elements for use in carrying out the prediction may consist of only three picture elements. Alternatively, each reference set may consist of seven elements, two next preceding in the present scanning line the element to be predicted and five in a next previous scanning line with a middle one of the five elements selected to be most adjacent to the present element. Five more elements may similarly be selected in another scanning line that next precedes the "next previous" line. Block codes may be substituted for the run-length codes. It is also possible to resort to other coding.

Although the first switch 23 is used in fact to select one of the thinning circuit 24 and the second peridiction circuit 26, it is possible to understand that the switch 23 serves to select, in effect, one of the first and the second prediction circuits 25 and 26 or 25' and 26' or alternatively one of the two encoding circuits. According to the pattern encoding device illustrated with reference to FIGS. 3 through 8, it is possible to deem that the output signals of the first and the second prediction circuits 25 and 26 are solely the sequences of first and second prediction error pulses, respectively. On the other hand, the output signal of each of the first and the second prediction circuits 25' and 26' of the encoding device 60 comprises relevant ones of the first and the second prediction error pulses in a sequence and pertinent ones of the first and the second mode codes in another sequence. When the element to be predicted is situated either along the first or initial one of the successive scanning lines or near the both ends of each scanning line, it is very likely that the picture element in question is one sampled from the background. The prediction circuit 25, 25', 26, or 26' is therefore well operable even for such an element.

What is claimed is:

1. A device for encoding an original pattern and a first area into an encoded signal, said pattern being printed on a surface of a pattern carrying medium with said area left on said surface as a background of said pattern, said pattern and said area being substantially of a first and a second tone, respectively, said device comprising:

sampling means for scanning said surface substantially along rectilinear and parallel scanning lines in succession and for sampling at predetermined sampling instants sequential picture elements along the respective scanning lines from said pattern and said area to produce substantially at the respective sampling instants successive sample pulses representative of the picture elements of said pattern and said area with a first and a second level, respectively;

thinning means responsive to said sample pulses for carrying out, in effect, thinning of said original pattern into a thinned pattern having less picture elements than said original pattern and thereby widening of said first area into a second area having accordingly increased picture elements as compared with said first area to produce substantially at the respective sampling instants successive preprocessed pulses representative of the picture elements of said thinned pattern and said second area with a third and a fourth level, respectively;

first predicting means responsive to a first reference set of picture elements for predicting, in effect, a first predicted picture element for a first actual picture element in accordance with a first prediction rule to produce a first prediction error pulse representative of an error between said predicted and said actual picture elements, said actual picture element being represented by the pre-processed pulse produced by said thinning means at each of said sampling instants, the picture elements of said reference set being represented by the pre-processed pulses produced by said thinning means at those of said sampling instants which are selected therefrom according to a first predetermined rule and include the sampling instant next preceding said each sampling instant, said first predicting means thereby producing a sequence of first prediction error pulses as at least a portion of an output signal thereof;

second predicting means responsive to a second reference set of picture elements for predicting, in effect, a second predicted picture element for a second actual picture element in compliance with a second prediction rule, different from said first prediction rule, to produce a second prediction error pulse representative of an error between said second predicted and actual picture elements, said second actual picture element being represented by the sample pulse produced by said sampling means at each of said sampling instants, the picture elements of said second reference set being represented by the sample pulses produced by said sampling means at those of said sampling instants which are selected therefrom complying with a second predetermined rule and include the sampling instant next previous to the sampling instant at which the sample pulse representative of said second actual picture element is produced, said second predicting means thereby producing a sequence of second prediction error pulses as at least a portion of an output signal thereof;

selecting means for selecting one of said first and said second predicting means to produce a selection code indicative of the selected predicting means; and encoding means for encoding the output signal of said selected predicting means into said encoded signal with said selection code placed therein.

2. A device as claimed in claim 1, wherein:

all allowable permutations of at least one of said third and said fourth levels of the pre-processed pulses representative of the picture elements of said first reference set are classified into a first prescribed number of first groups according to the probability of the event that said first predicted picture element correctly agrees with said first actual picture element;

all permissible permutations of at least one of said first and said second levels of the sample pulses representative of the picture elements of said second reference set being classified into a second prescribed number of second groups according to the probability of the event that said second predicted picture element correctly coincides with said second actual picture element;

said first predicting means comprising:

means responsive to the pre-processed pulses for said first reference set for producing in accordance with said first prediction rule a first predicted pulse representative of said first predicted picture element;

means responsive to said first predicted pulse and the pre-processed pulse representative of said first actual picture element for producing a relevant one of said first prediction error pulses; and first means responsive to the pre-processed pulses for said first reference set for producing a first mode code indicative of one of said first groups into which the permutation had by the pre-processed pulses for said first reference set is classified, said first means thereby producing a sequence of first mode codes as another portion of the output signal of said first predicting means;

said second predicting means comprising:

means responsive to the sample pulses for said second reference set for producing in compliance with said second prediction rule a second predicted pulse representative of said second predicted picture element;

means responsive to said second predicted pulse and the sample pulse representative of said second actual picture element for producing a pertinent one of said second prediction error pulses; and second means responsive to the sample pulses for said second reference set for producing a second mode code indicative of one of said second groups into which the permutation had by the sample pulses for said second reference set is classified, said second means thereby producing a sequence of second mode codes as another portion of the output signal of said second predicting means;

said encoding means comprising:

coding means for encoding the respective prediction error pulses included in the output signal of said selected predicting means into output codes predetermined in consideration of the groups sequentially indicated by the respective mode codes included in the last-mentioned output signal; and means for arranging said selection code and said output codes in a predetermined order to produce said encoded signal.

3. A device as claimed in claim 2, said sampling instants being predetermined so that said picture elements are sampled substantially along rectilinear and parallel lines intersecting said scanning line, wherein:

each of said first and said second predetermined rules is determined so as to make an associated one of said first and said second reference sets consist of a first through a fourth picture element, said fourth picture element being next previous to a relevant one of said first and said second actual picture elements in one of said scanning lines along which said relevant picture element is sampled, said second picture element being most adjacent to said relevant picture element in a pertinent one of said scanning lines that is next previous to the first-mentioned one scanning line in said succession, said first and said third picture elements next preceding and next succeeding, respectively, said relevant picture element in said pertinent scanning line;

each of said first and said second prescribed numbers being selected to be two;

one and the other of said first groups and one and the other of said second groups consisting of the permutations (0 0 0 0), (0 1 1 1), (1 0 0 1), (1 1 1 0), (0 0 1 1), (1 1 0 0), and (1 0 1 0), the permutations (1 0 1 1), (1 1 1 1), (0 1 0 0), (0 0 1 0), (1 0 0 0), (0 1 1 0), (1 1 0 1), (0 1 0 1), and (0 0 0 1), the permutations (0 0 0 0), (0 0 0 1), (0 0 1 0), (1 1 0 0), (1 1 0 1), (1 1 1 0), (1 1 1 1), and (0 1 0 1), and the permutations (0 0 1 1), (1 0 1 0), (1 0 0 1), (0 1 1 0), (0 1 0 0), (1 0 1 1), (0 1 1 1 ), and (1 0 0 0), respectively, for concerned ones of said pre-processed and said sample pulses representative of said first through said fourth picture elements. where "0" and "1" represent said third and said fourth levels, respectively, when the permutations are for said first groups and said first and said second levels, respectively, when the permutations are for said second groups;

each of said first and said second prediction error pulses having a fifth and a sixth level when the prediction of a relevant one of said first and said second predicted picture elements is correct and wrong, respectively;

said output codes being predetermined so that:

said fifth level is rendered shorter and longer for a longer duration of the correct prediction when said first and said second mode codes indicate said ones and said others, respectively, of related ones of said first and said second groups; and said sixth level is rendered longer and shorter for a longer duration of the wrong prediction when said first and said second mode codes indicate said ones and said others, respectively, of concerned ones of said first and said second groups.

4. A device for encoding an original pattern and a first area into an encoded signal, said pattern being printed on a surface of a pattern carrying medium with said area left on said surface as a background of said pattern, said pattern and said area being substantially of a first and a second tone, respectively, said device comprising:

sampling means for scanning said surface substantially along rectilinear and parallel scanning lines in succession and for sampling at predetermined sampling instants sequential picture elements along the respective scanning lines from said pattern and said area to produce substantially at the respective sampling instants successive sample pulses representative of the picture elements of said pattern and said area with a first and a second level, respectively;

thinning means responsive to said sample pulses for carrying out, in effect, thinning of said original pattern into a thinned pattern having less picture elements than said original pattern and thereby widening of said first area into a second area having accordingly increased picture elements as compared with said first area to produce substantially at the respective sampling instants successive pre-processed pulses representative of the picture elements of said thinned pattern and said second area;

first predicting means responsive to a first reference set of picture elements for predicting, in effect, a first predicted picture element for a first actual picture element in accordance with a first prediction rule to produce a first prediction error pulse representative of an error between said predicted and said actual picture elements, said actual picture element being represented by the pre-processed pulse produced by said thinning means at each of said sampling instants, the picture elements of said reference set being represented by the pre-processed pulses produced by said thinning means at those of said sampling instants which are selected therefrom according to a first predetermined rule to include the sampling instant next preceding said each sampling instant, said first predicting means thereby producing a sequence of first prediction error pulses as at least a portion of an output signal thereof;

second predicting means responsive to a second reference set of picture elements for predicting, in effect, a second predicted picture element for a second actual picture element in compliance with a second prediction rule, different from said first prediction rule, to produce a second prediction error pulse representative of an error between said second predicted and actual picture elements, said second actual picture element being represented by the sample pulse produced by said sampling means at each of said sampling instants, the picture elements of said second reference set being represented by the sample pulses produced by said sampling means at those of said sampling instants which are selected therefrom complying with a second predetermined rule to include the sampling instant next previous to the sampling instant at which the sample pulse representative of said second actual picture element is produced, said second predicting means thereby producing a sequence of second prediction error pulses as at least a portion of an output signal thereof;

first encoding means for encoding the output signal of said first predicting means to produce a sequence of first codes;

second encoding means for encoding the output signal of said second predicting means to produce a sequence of second codes;

selecting means for selecting one of said first and said second encoding means to produce a selection code indicative of the selected encoding means; and multiplexing means for multiplexing said selection code and one of said sequences of first and second codes that is produced by said selected encoding means to produce said encoded signal.

* * * * *

UNITED STATES PATENT AND TRADEMARK OFFICE
CERTIFICATE OF CORRECTION

PATENT NO. : 4,215,374
DATED : July 29, 1980
INVENTOR(S) : Shoji MIZUNO

It is certified that error appears in the above—identified patent and that said Letters Patent is hereby corrected as shown below:

Column 4, line 27, delete "m" and insert -- $\hat{m}$ --

Signed and Sealed this

Third Day of February 1981

[SEAL]

Attest:

RENE D. TEGTMEYER

Attesting Officer     Acting Commissioner of Patents and Trademark